United States Patent [19]

Izbicki

[11] 4,115,624

[45] Sep. 19, 1978

[54] THERMOSTAT METAL COMPOSITIONS

[75] Inventor: Anthony J. Izbicki, Reading, Pa.

[73] Assignee: Hood & Co., Inc., Hamburg, Pa.

[21] Appl. No.: 782,587

[22] Filed: Mar. 29, 1977

[51] Int. Cl.² .................... B32B 15/18; B32B 15/20
[52] U.S. Cl. .................................. 428/617; 428/618; 428/619; 428/676
[58] Field of Search ............... 428/616, 617, 618, 619, 428/676

[56] References Cited

U.S. PATENT DOCUMENTS

| | | | |
|---|---|---|---|
| 3,102,793 | 9/1963 | Alban | 428/617 |
| 3,563,712 | 4/1965 | Zeigler | 428/617 |
| 3,767,370 | 10/1973 | Ornstein | 428/617 |

FOREIGN PATENT DOCUMENTS 927,620 5/1963 United Kingdom ............... 428/617

*Primary Examiner*—Arthur J. Steiner
*Attorney, Agent, or Firm*—Richard O. Church

[57] ABSTRACT

Thermostat metal compositions are disclosed which have a substantially uniform flexivity over a broad range of operating temperatures and which respond rapidly to changes in ambient temperatures. These results are achieved by using, as an intermediate layer, a major portion by volume of a thermostat metal that has a thermal conductivity in excess of 2,400 BTU in/ft² hr° F.

7 Claims, 3 Drawing Figures

FIG. 1
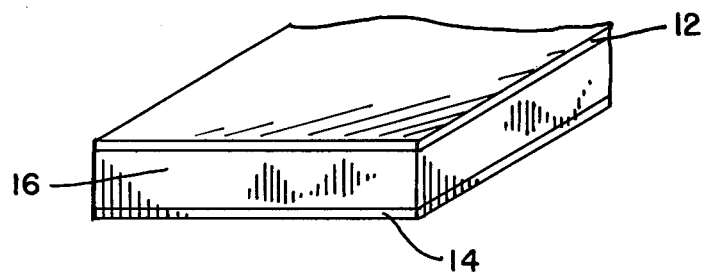
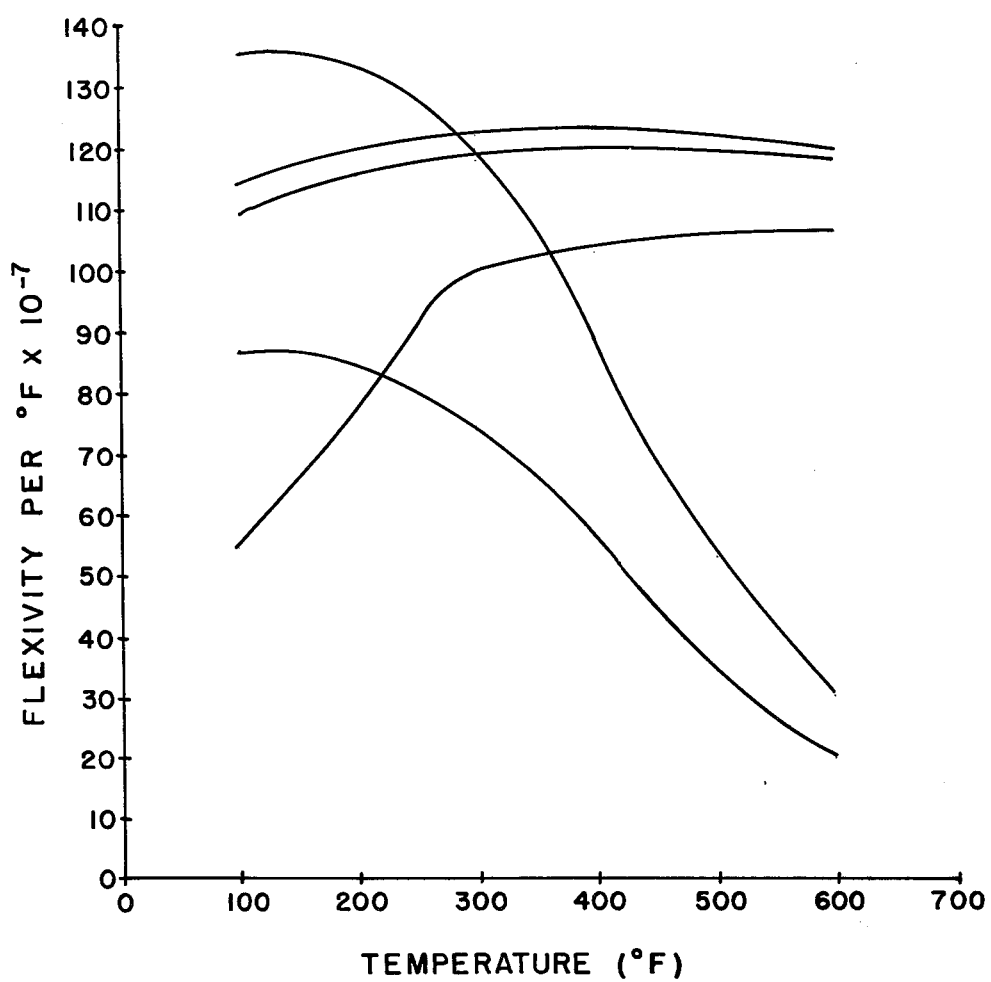
FIG. 2

THERMOSTAT METAL COMPOSITIONS

DEFINITIONS

The term "thermostat metal" is used to mean a composite material, usually in the form of sheet or strip, comprising two or more materials of any appropriate nature, metallic or otherwise, which, by virtue of the differing expansivities of the components, tends to alter its curvature when its temperature is changed (taken from A.S.T.M. DB-88-75).

The term "thermal equilibrium" is used to mean that condition at which all of the components of the thermostat metal are at the ambient temperature.

The term "flexivity" is used to mean the measure of the thermal response of the thermostat metal at thermal equilibrium expressed in inch per inch per degree Farenheit as defined in A.S.T.M. B-106.

BACKGROUND OF THE INVENTION

1. Field of the Invention

This invention relates to thermostat metals and, more particularly, to thermostat metals which have a substantially uniform flexivity over a broad range of useful operating temperatures and which have a rapid response to a change in ambient temperature.

2. Description of the Prior Art

A wide variety of metals are presently available which are made up of two or more layers of metallic alloys bonded to each other. At least one of the layers has a relatively high coefficient of thermal expansion and another layer has a relatively lower coefficient of thermal expansion which causes the thermostat metal to deflect when the ambient temperature is changed. Thermostat metals are used in a variety of different applications to provide electrical and temperature overload protection and to measure or regulate the temperature of a device.

Electrical overload protection may be provided, for example, by a circuit breaker of the type in which a current is conducted through a thermostat metal and the breaker is actuated under overload conditions by the $I^2R$ loss which heats the thermostat metal. In this type of application, the properties of thermostat metal are comparatively noncritical since, as the breaker is always either fully open or shut, the metal only need have a high flexivity and the desired electrical resistivity to function satisfactorily. Adjusted of the electrical resistivity for a given application is not difficult as a layer of high electrical conductivity metal in a selected thickness can be included as one of the components of the thermostat metal to provide the desired resistivity. U.S. Pat. No. 3,767,370 discloses such a structure in which from 5 to 60% of a copper alloy is used as the electrical conductive element in combination with low conductivity alloys that have relatively low and high coefficients of thermal expansion.

The design of thermostat metals for applications in which the actuating heat is not internally generated presents design problems of somewhat more complexity. For example, in a thermostat used to maintain the temperature of an object at a variably selected temperature, it is important that flexivity be reasonably constant over the operating temperature range of the device — i.e., deflection should have a linear response to temperature changes for ease in calibration and, if reasonably accurate temperature control is to be maintained, the thermostat metal should reach thermal equilibrium at a rate approximately equal to the rate at which the ambient temperature can change. The latter is true because if the rate at which the thermostat metal reaches equilibrium lags behind the heating or cooling rate, to the extent of such lag, there will be an overshoot in temperature before the thermostat metal responds to temperature changes.

The problem of rapidly reaching thermal equilibrium is essentially absent in the simple circuit breaker discussed above in which current is carried by the thermostat metal. This is so since the thermostat metal is internally heated by the current flowing through it and therefore immediate response is achieved under overload conditions. In distinction to this, however, the thermostat metals with which this invention is primarily concerned are those that must respond to an externally applied heat stimulus. In order for these devices to reach thermal equilibrium, heat must be conducted through the outer layers of the thermostat metal toward the center until a uniform temperature is reached throughout.

In the simple circuit breaker application, both heat and electricity may be conducted along the longitudinal axis of the thermostat metal at a rate substantially limited only by the element having the highest rate of thermal conductivity. In contrast, when the thermal stimulus is external, the limiting factor becomes transverse and thermal conductivity is limited by the elements that have the lowest rate of thermal conductivity. Thus, it does not necessarily follow that a thermostat metal that has a high rate of thermal conductivity along its axis will reach thermal equilibrium rapidly in response to external ambient temperature changes.

SUMMARY OF THE INVENTION

Accordingly, it is the object of this invention to provide thermostat metals that respond rapidly to externally-induced temperature changes.

Another object of this invention is to provide thermostat metals that have a substantially uniform flexibility over a wide operational temperature range.

Another object of this invention is to provide thermostat metals that will respond to maintain operator-set temperature changes without substantial overshoot either when cooling or heating.

Briefly, these and other objects of this invention are achieved by selecting an alloy of high and an alloy of low thermal expansive coefficient which, when paired, have a reasonably constant flexivity over a useful temperature range. Only a minimum thickness of these layers is used as is required to develop the forces required to cause a desired mechanical movement. The basic strength and rigidity of the thermostat metal is provided by means of a central layer, much thicker than the total thickness of the outer alloy layers, of a metal having very high heat conductivity. In the preferred embodiment of this invention, the least expansive outer layer is a nickel/iron alloy ranging from 39 to 52% nickel, the high expansive outer layer is an alloy of 22% nickel, 3% chrome, balance iron, and the central layer is substantially pure copper. To achieve the high thermal conductivity desired, the copper component should respresent at least 60% of the total thickness of the thermostat metal.

In the selection of the least expansive element, ferrous alloys having between about 39% nickel and 52% nickel are used because they are characterized by a uniform coefficient of thermal expansion over a wide temperature range. 42% nickel is particularly preferred because of its relatively low and uniform thermal expansion coefficient (2.9 × $10^{-6}$ inch/inch/°F plus or minus 0.13 in the range of 7° to 700° F as annealed) and a low coefficient of thermal elasticity (48 × $10^{-6}$ per °F).

(It may be noted that one of the more commonly used alloys for the least expansive layer is a ferrous alloy with 36% nickel because it has one of the lowest coefficients of thermal expansion [0.9 × $10^{-6}$ inch/inch/°F in the range of 70° to 200° F when cold rolled]. Unfortunately, its thermal expansion coefficient begins to change quite rapidly at comparatively low temperatures [200° to 250° F] and thus it is difficult to make a thermostat metal with this alloy having a uniform flexivity over a wide operating range.)

The high expansive outer layer may be chosen from a variety of high expansive alloys. One of those that is preferred is comprised of 22% nickel, 3% chromium and the balance iron because of its reasonably constant high coefficient of thermal expansion (10.85 × $10^{-6}$ inch/inch/°F plus or minus 0.27 in the temperature range of 77° to 600° F) and its resistance to environmental corrosion.

The preferred material for the high thermal conductivity center layer is substantially pure copper. Many forms of pure copper are described in the standard handbook published by the Copper Development Association, Inc. and will be referred to by their respective C.D.A. numbers. Although any of the several forms of copper with thermal conductivity values greater than about 2,400 BTU in/ft$^2$hr°F are within the scope of this invention, the preferred forms are high-purity, oxygen-free copper described by C.D.A. Nos. 101 and 102 and oxygen-free copper with silver described by C.D.A. Nos. 104, 105 and 107, thermal conductivities of which are in the range of 2,688 to 2,712 BTU in/ft$^2$hr°F. The desirability of using the highest thermal conductivity grades of copper can be appreciated by a comparison with the conductivity of other alloys utilized in the thermostat metal composition such as 42% nickel, balance iron, at 74.5 BTU in/ft$^2$hr°F and that of 36% nickel, balance iron at 72.6 BTU in/ft$^2$hr°F.

Many copper alloys, while containing only slight amounts of alloying metals, are not desirable for use as the high thermal conductivity center layer because of the poor conductivity as compared with pure copper. For example, C.D.A. No. 505 (phosphor bronze) of 98.7% nominal copper content has a thermal conductivity value of only 1,400 BTU in/ft$^2$hr°F.

DESCRIPTION OF THE DRAWINGS

The invention can be better understood in connection with the accompanying drawings in which:

FIG. 1 is a partial perspective view of the thermostat metal made in accordance with this invention;

FIG. 2 is a graphic presentation of the variations in flexivity obtained when using thermostat metal made in accordance with this invention compared with other thermostat materials.

Figure 3:
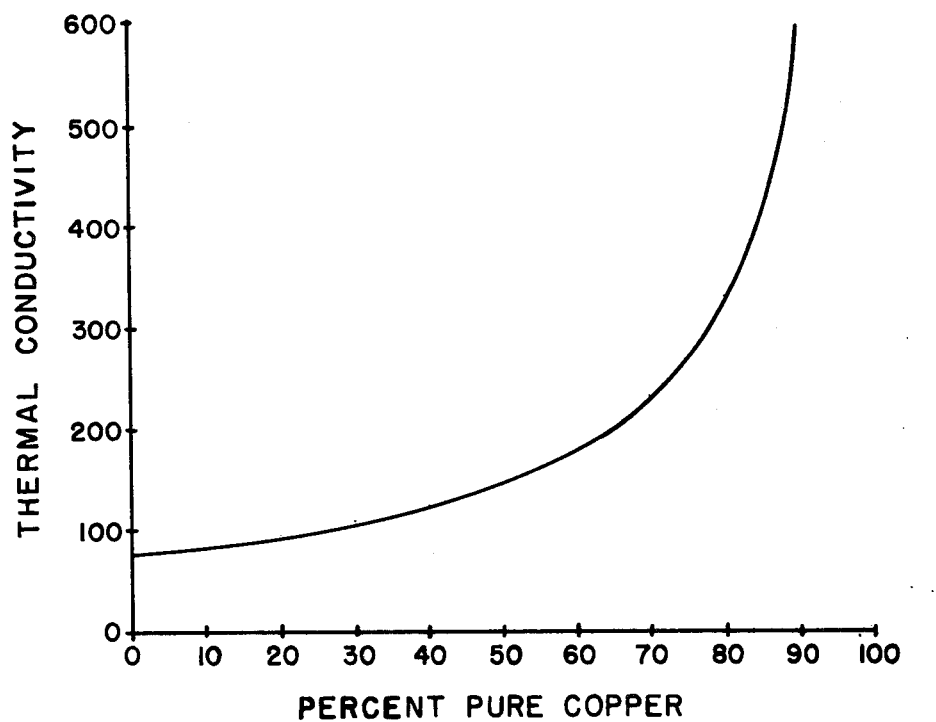
FIG. 3 is a graphic presentation of the effect that changes in the volume percentage of the high and low expansive metals present in the thermostat metal have upon the transverse thermal conductivity.

It can be understood that the thinner the layers of the high and low expansive elements of a thermostat metal, the less effect that their thermal conductivity will have upon a response to a change in ambient temperature. By way of example, if these layers were of molecular thickness, the response to temperature changes would be instantaneous. In practice, however, a certain minimum thickness is required to cause a desired mechanical movement. Consistent with the foregoing, the thickness of the high and low expansive metals are reduced to a minimum thinness that will provide necessary mechanical movement and an intermediate layer of high heat conductivity material, such as pure copper, to provide most of the required strength and rigidity of the thermostat metal. By these means, the effects of poor thermal conductivity of the high and low expansive elements are minimized and the rate of thermal response of the thermostat metal maximized.

In FIG. 1 there is shown a strip of composite thermostat metal made in accordance with this invention which is indicated generally by the reference numeral 10. As illustrated, the composite thermostat material 10 includes a first outer layer 12 of a metallic alloy having a relatively high coefficient of thermal expansion, a second outer layer 14 of an alloy having a comparatively low coefficient expansion and a major (over 60% by volume) intermediate layer 16 having a heat conductivity in excess of about 2,400 BTU in/ft$^2$hr°F. By these means, the heat conductivity, when measured in a transverse direction (i.e., through the planes of the layers), will exceed 300 BTU in/ft$^2$hr°F, and in the preferred embodiment of this invention will be greater than 322 BTU in/ft$^2$hr°F.

In the fabrication of the composite thermostat metal, the first and second outer layers 12 and 14 are adhered to or metallurgically bonded with the opposite surfaces of intermediate layer 16 using techniques that are well known in the art.

Five samples of thermostat metals (A-E) were prepared in obtaining the data for FIGS. 2 and 3, and their properties of flexivity deviation over the temperature range of 100° to 600° F and transverse thermal conductivity were measured. These are tabularized below and are shown graphically in FIG. 2.

|  | A | B | C | D | E |
|---|---|---|---|---|---|
| 1st Low Expansive Ferrous Alloy Layer | 42% Ni | 36% Ni | 36% Ni | 42% Ni | 42% Ni |
| 2nd Heat Conductive Layer | CDA-102 | CDA-102 | CDA-104 | CDA-104 | None |
| 3d High Expansive Ferrous Alloy Layer | 22% Ni 3% Cr | 22% Ni 3% Cr | 22% Ni 3% Cr | 22% Ni 3% Cr | 22% Ni 3% Cr |
| Ratio of Thicknesses 1/2/3 | 16/76/8 | 16/76/8 | 43/52/5 | 43/52/5 | 50/0/50 |
| Flexivity Deviation 300° F-600° F | +6% | −76% | −74% | ≈0 | −1.6% |
| Transverse Thermal Conductivity (BTU in/ft$^2$-hr° F) | 322 | 320 | 152 | 155 | 88 |

FIG. 2 indicates that the selection of the least expansive side material is critical to the uniformity of the flexivity over the test temperature range. In all five of the examples, the 22% Ni/3% Cr alloy was uniformly used as the high expansive material, but, for comparison purposes, the low expansive material was varied from a 36% Ni alloy in Examples B and C to a 42% nickel ferrous alloy in Examples A, D and E. As is abundantly clear from FIG. 2, the flexivity change of the thermostat metal made from the 36% Ni alloy was extremely poor as compared with the 42% over a temperature range exceeding about 200° F which would make it difficult to use in a thermostat metal application where a reasonable temperature calibration is desired. Expressed numerically, the maximum flexivity deviation over the temperature range of 300°-600° F of the 42% Ni alloy was only 6%, and, expressed in terms of the slope of the curve, the maximum deviation was only about 0.2 inch/inch/°F/°F. Actually, these are fairly close tolerances that may be more rigorous than required in many applications and, as a generalization, it can be said that, in the practice of this invention, flexivity deviations should not exceed plus or minus 15% and the slope of the flexivity curve should not exceed plus or minus 0.05 inch/inch/°F/°F in the 300°-600° F range.

The data accumulated with respect to Examples A-E also shows the dramatic effect that a high percentage of pure copper has upon the transverse thermal conductivity. Note that when only the high and low expansive metals are used without substitution of copper (Example A), the conductivity was only 88 BTU in/ft²hr°F, and, even with a greater than 50% over-all substitution of pure copper, the conductivity increased only to 155 (Example D). However, when a 76% substitution of pure copper was made (Example A), a very considerable increase in transverse thermal conductivity to 320 BTU in/ft²hr°F was obtained. It can be understood that the ability of the thermostat metal to reach thermal equilibrium rapidly is directly related to the transverse thermal conductivity.

FIG. 3 illustrates the effect of substituting varying quantities of pure copper for the high and low expansive materials upon transverse thermal conductivity. This curve is essentially a straight line sloping gradually upwardly until about 50% copper is substituted for the other metals. Between 50 and 60% substituted copper, a clearly defined break appears in this curve, and above 60% copper substitution, the transverse heat conductivity rises rapidly until, at about 80% copper substitution, the curve begins to approach the theoretical conductivity value for pure copper asymptotically.

From the foregoing, it can be understood that both thermal conductivity and flexivity are important design parameters in the design of thermostat metals of the type with which this invention is concerned. By way of further illustration as to the manner in which this combination of properties is balanced to provide the desired properties in the practice of the instant invention, the following example is given.

A cantilever mount blade of 0.75 inch active length by 0.350 inch width is required to move a distance of 0.025 inch over a temperature range of 100° to 500° F with the distance of travel approaching a linear function of temperature as nearly as possible. The movement of the blade, induced by changes in ambient temperatures, is designed to close an electrical control switch when a device being controlled is below a preselected temperature and open the switch when the desired temperature is reached. This type of application for thermostat metals is common in household appliances such as electric irons and the like.

Several blades were made using the compositions of the previous examples in which the total thickness of the thermostat metal was adjusted to provide in the above-defined deflection.

| Example | Thickness (inches) |
|---|---|
| A | 0.0426 |
| D | 0.0331 |
| E | 0.0316 |

The thermostat metals of Examples B and C could not be used because no single thickness could be made to function properly over the desired operative temperature range (300° to 600° F).

If identical thermostat metals (except for the thicknesses tabularized above) are placed in identical heating environments, the relative rate at which they reach temperature equilibrium with the environment is as follows:

| Example | Relative Rate |
|---|---|
| A | 1 |
| D | 0.608 |
| E | 0.368 |

The relative rates indicated in the above table are experimentally reflected in temperature overshoot. Temperature overshoot may be defined as the number of degrees' lag between the response of a thermostat metal and the ambient temperature change under identical heating conditions. Data for the thermostat metals of Examples A, D and E are as follows (the heating rate imposed approximated that of a household steam iron):

| Example | ° F Temperature Overshoot |
|---|---|
| A | 2° F to 8° F |
| D | 5° F to 15° F |
| E | 90° F to 150° F |

This demonstrates quite clearly that the thermostat metal of Example A is better than Example D and that both are dramatically superior to the thermostat metal of Example E in their ability to respond rapidly to changes in ambient temperature. The sensitivity of the thermostat metals of Examples A and D, coupled with their flexivity characteristic that provides nearly linear response to temperature changes over an extended temperature range is of great practical utility in the design of thermomechanical devices.

I claim:

1. A thermostat metal in which the transverse conductivity is above about 200 BTU in/ft²hr°F comprising:
   a first layer of a high expensive metal;
   a second layer of a low expansive metal;
   the metals of the first and second layers cooperating to provide substantially uniform flexivity over an extended temperature range; and
   an intermediate layer of substantially pure copper comprising over 60% by volume of the thermostat metal, having a thermal conductivity in excess of 2,400 BTU in/ft²hr°F.

2. A thermostat metal according to claim 1 wherein the first layer is a ferrous alloy comprised of 22% nickel and 3% chrome.

3. A thermostat metal according to claim 1 wherein the second layer is a ferrous alloy comprised of between 39 and 52% nickel.

4. A thermostat metal according to claim 1 wherein the transverse conductivity is above about 300 BTU in/ft²hr°F.

5. A thermostat metal according to claim 1 wherein the deviation in flexivity in the temperature range of 300°–600° F is less than plus or minus 15%.

6. A thermostat metal according to claim 1 wherein the deviation in flexivity in the temperature range of 300°–600° F is less than plus or minus 5%.

7. A thermostat metal according to claim 1 wherein the slope of the curve in which flexivity is plotted as the ordinate and temperature as the abscissa does not exceed plus or minus 0.05 inch/inch/°F/°F in the temperature range of 300°–600° F.

* * * * *